United States Patent Office 3,541,173
Patented Nov. 17, 1970

3,541,173
PROCESS FOR MAKING COLORLESS STYRENE
Leon E. Solomon and John E. Ollerenshaw, Sarnia, Ontario, Canada, assignors to The Dow Chemical Company, Midland, Mich., a corporation of Delaware
No Drawing. Filed Apr. 28, 1969, Ser. No. 819,974
Int. Cl. C07c 7/18
U.S. Cl. 260—669                                                      4 Claims

ABSTRACT OF THE DISCLOSURE

The disclosure concerns a process for removing color from styrene by treating the colored styrene with hydrazine or a hydrazine derivative.

---

This invention concerns a process and agents for making colorless styrene. It relates more particularly to a process and agents which removes color that develops in commercial styrene during storage and shipping.

In the manufacture of styrene by dehydrogenating ethylbenzene, it is common practice to add inhibitors to the stills wherein the monomer is separated from the other products of the reaction and in the final distillation units from which is separated the commercial grade of styrene monomer. The commercial grades of styrene monomers contain small amounts of one or more inhibitors, e.g., para-tertiary-butylcatechol, quinone, hydroquinone, pyrocatechol, pyrogallol, guaiacol, naphthol, mono-, di-, or trinitrobenzene, or 2,4-dichloro-6-nitrophenol, as antioxidants or polymerization inhibitors to prevent the formation of polymers in the monomeric styrene during storage and shipping. It is common practice to store and ship monomeric styrene in metal containers or vessels such as cans, drums, tank trucks, barges, tankers, and including large capacity steel storage vessels. In the storing and shipping of monomeric styrene containing small amounts of polymerization inhibitors, the styrene oftentimes develops an undesirable brown, yellow, or yellow-green color which renders the monomer unsuitable for many purposes. The removal of such color from large quantities of monomer such as a tank car load, or a shipping vessel, such as a barge tanker or an ocean tanker not only is costly but has heretofore involved reprocessing of the colored monomeric styrene by, for example, treating the monomer with activated alumina, or by a flash distillation of the monomer to obtain monomeric styrene free from color. Such treatments also remove inhibitor which must be replaced in the reprocessed styrene.

It has now been discovered that commercial monomeric styrene containing small amounts of polymerization inhibitors, which styrene develops color during storage or shipping an iron or steel vessels can readily be made colorless or "water-white" by dissolving in the colored monomeric styrene a small amount of hydrazine or a hydrazine derivative having the general formula $$H_2N-NH-R$$

wherein R represents an alkyl radical or an aryl radical. The invention makes colorless styrene monomer without removing the inhibitors therein.

Hydrazine is the preferred agent, but among suitable hydrazine derivatives are the alykl derivatives having the above formula wherein R represents an alkyl radical having from 1 to 12, preferably from 1 to 8 carbon atoms, and aryl derivatives wherein R represents the phenyl, tolyl or xylyl radical. More specifically, suitable compounds are hydrazine, methylhydrazine, ethylhydrazine, isopropylhydrazine, butylhydrazine, amylhydrazine, hexyldrazine, octylhydrazine, decylhydrazine, dodecylhydrazine, phenylhydrazine, tolylhydrazine and xylylhydrazine. Mixtures of any two or more of such compounds can also be used. The hydrazine compound can be used in amounts corresponding to from about 1 to 50, preferably from 2 to 20 parts by weight of the hydrazine compound per million parts by weight of the colored monomeric styrene.

In practice, the hydrazine compound is employed in the small amount within the above stated ranges that is required to render the styrene colorless or substantially colorless, e.g., having an APHA color of 10 or below. The decoloring of the styrene monomer occurs substantially instantaneously with dissolving or mixing of the hydrazine compound in the monomer. The small amount of the hydrazine compound usually required in the process of the invention to make colorless or substantially colorless the styrene monomer has little, if any, action on the polymerization characteristics of the styrene, or the properties of the polymer made therefrom.

The following examples illustrate ways in which the principle of the invention has been applied, but are not to be construed as limiting its scope.

EXAMPLE 1

Monomeric styrene that was stored in a 10,000 gallon steel tank and which styrene initially contained about 10 parts of tertiary-butylcatechol per million parts of weight of styrene as polymerization inhibitor, was found to have a yellow-green color, which color rendered the styrene unsalable.

In each of a series of experiments, to test portions consisting of 35 ml. of the colored styrene monomer there was added a small portion of a solution consisting of 0.05 percent by weight of hydrazine dissolved in colorless or water-white monomeric styrene containing 10 parts of tertiary-butylcatechol per million parts of styrene monomer. Table I identifies the experiments and gives the amount of hydrazine, expressed as parts by weight of hydrazine per million parts by weight of the colored styrene, that was added. The table also gives the color of the treated styrene expressed as APHA units as determined on the Hellige Aqua Tester. It may be mentioned that an APHA reading of about 10 or lower appears colorless or water-white to the naked eye and that the removal of the color was substantially instantaneous, upon mixing a small but effective amount of the hydrazine with the colored styrene.

TABLE I

| Run No. | Hydrazine, p.p.m. | Styrene color APHA |
|---|---|---|
| 1 | 0 | <30 >25 |
| 2 | 1 | <25 >20 |
| 3 | 2 | <20 >10 |
| 4 | 3.4 | <10 >5 |
| 5 | 4.9 | <10 >5 |

EXAMPLE 2

The experiments were repeated, except that methylhydrazine was used in place of the hydrazine used in Example 1. The results are reported in the following Table II.

TABLE II

| Run No. | Methylhydrazine, p.p.m. | Styrene color APHA |
|---|---|---|
| 1 | 0 | <30 >25 |
| 2 | 1.4 | <25 >20 |
| 3 | 2.9 | <15 >10 |
| 4 | 4.3 | <10 >5 |
| 5 | 5.7 | <5 >0 |

EXAMPLE 3

The experiments were repeated except using phenylhydrazine. The results are reported in Table III below.

TABLE III

| Run No. | Phenyl-hydrazine, p.p.m. | Styrene color APHA | |
| --- | --- | --- | --- |
| 1 | 0 | <30 | >25 |
| 2 | 3.6 | <20 | >15 |
| 3 | 7.1 | <15 | >10 |
| 4 | 10.7 | <5 | >0 |

What is claimed is:

1. A process for making colorless styrene monomer which comprises dissolving in liquid monomeric styrene which has developed color during storage and/or shipping, hydrazine or a hydrazine compound having the general formula:

$$H_2N-NH-R$$

wherein R represents an alkyl or an aryl radical, to effect reaction between the colorant and said hydrazine compound.

2. A process as claimed in claim 1, wherein the hydrazine compound is methylhydrazine.

3. A process as claimed in claim 1, wherein the hydrazine compound is phenylhydrazine.

4. A process for making colorless styrene which comprises dissolving hydrazine in commercial liquid monomeric styrene which has developed color during storage and shipping in iron vessels to effect reaction between the colorant and the hydrazine.

References Cited

UNITED STATES PATENTS 3,392,204   7/1968   Albert _____ 260—666.5

DELBERT E. GANTZ, Primary Examiner

C. R. DAVIS, Assistant Examiner